May 3, 1960
B. M. HYMAN
2,934,880
WHEEL SHIELD MOUNTING FOR CORN PICKERS
Filed April 25, 1958
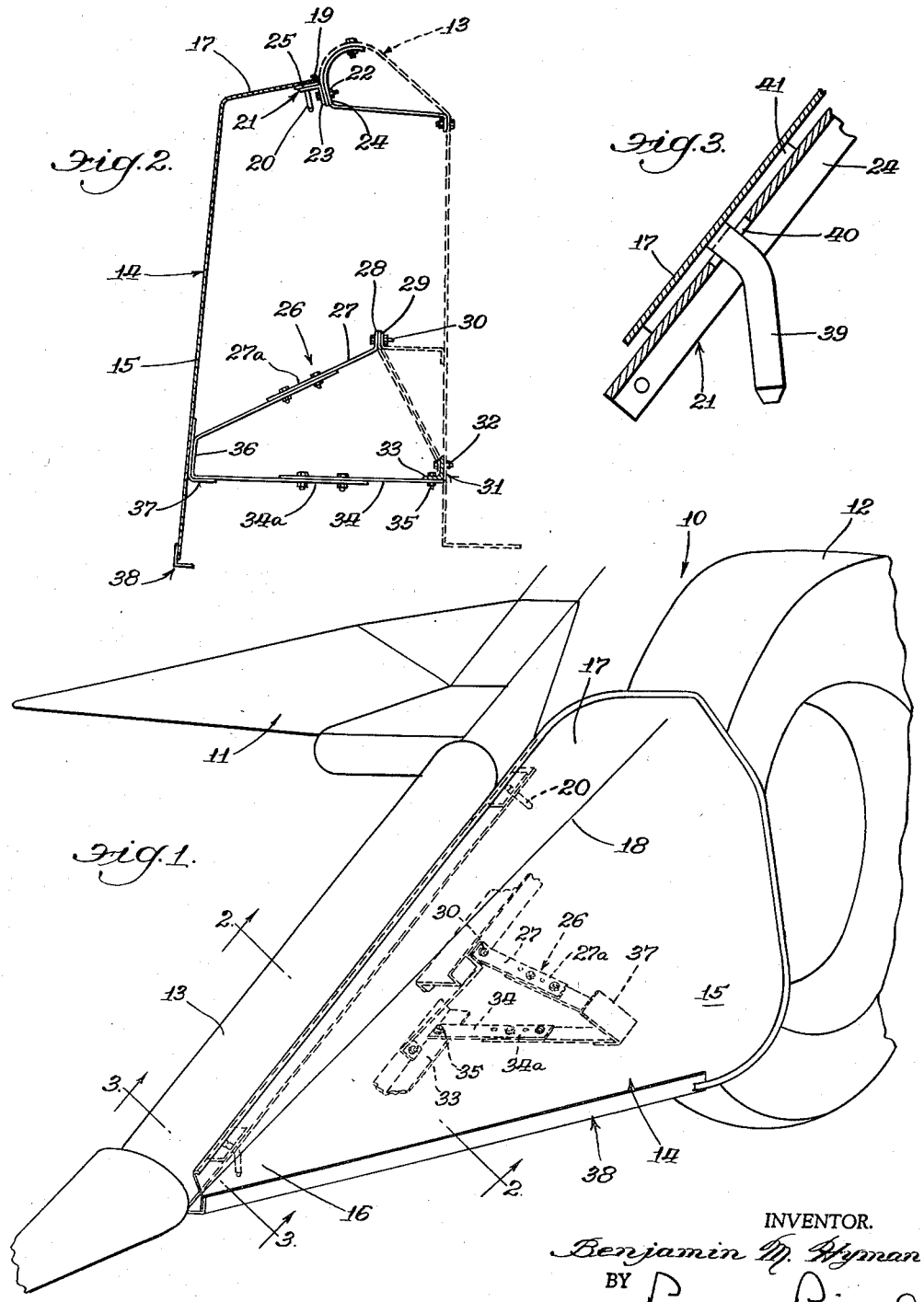
INVENTOR.
Benjamin M. Hyman
BY Paul O. Pippel
Atty.

United States Patent Office 2,934,880
Patented May 3, 1960

2,934,880
WHEEL SHIELD MOUNTING FOR CORN PICKERS

Benjamin M. Hyman, East Moline, Ill., assignor to International Harvester Company, Chicago, Ill., a corporation of New Jersey Application August 25, 1958, Serial No. 756,879

1 Claim. (Cl. 56—119)

This invention relates to a new and improved wheel shield mounting for corn pickers.

The mounting of corn pickers on tractors has always presented a major problem to corn picker users who also use their tractors for purposes other than corn picking. With present day arrrangements it is desirable to run the tractor in from the rear of the picker and with suitable mounting mechanisms the picker is raised and locked in position on the tractor. However, in many instances the corn picker is not supplied with adequate sheet shielding means to cover the forward portion of the tractor's large ground-engaging traction wheels.

It is, therefore, a principal object of this invention to provide a shield for the forward portion of a wheel and including the mounting of the shield on tractor-mounted corn pickers.

Another important object of this invention is the provision of means in a tractor-mounted corn picker for removably receiving a shield wherein the shield forms a substantially continuous unbroken surface from a forward point adjacent the gathering unit to a position rearwardly and around the forward portion of a large ground-engaging traction wheel of the tractor.

Another important object of this invention is to supply a wheel shield for tractor-mounted corn pickers wherein the wheel shield is equipped with spaced apart fixed pins arranged and constructed to loosely engage spaced apertures in the side of the corn gathering mechanism.

Another and still further important object of this invention is to equip a wheel shield for corn pickers with a three-point mounting on the side of the corn gathering unit wherein the wheel shield may be merely hung on the side of the gathering sheet and yet be held in substantially fixed operating position through the rough terrain of a corn field to guide the corn around the large traction wheels of the tractor.

Other and further important objects and advantages will become apparent from the disclosures in the following specification and accompanying drawing in which:

Figure 1 is a perspective view of a portion of a tractor-mounted corn picker having the wheel shield of this invention mounted thereon;

Figure 2 is a sectional view taken on the line 2—2 of Figure 1; and

Figure 3 is a sectional view taken on the line 3—3 of Figure 1.

As shown in the drawings, the reference numeral 10 indicates generally a tractor on which is mounted a corn picker 11. The tractor is only meagerly shown and in fact only the relatively large ground-engaging traction wheel 12 is shown. The corn picker is also only partially shown and includes a corn gathering unit 13 which extends and is inclined downwardly and forwardly for passage through a field of standing corn to effect a harvest of that corn. In most present day corn pickers of the tractor-mounted type the relatively large tractor traction wheels 12 are disposed outside the line of travel of the corn picker or gathering unit 13 of the picker 11. Thus if all of the corn is not accurately guided into the machine then the tractor wheels 12 would be apt to run over these down or otherwise misguided stalks making a subsequent harvest thereof extremely difficult. In order to avoid this running down of the stalks which may not be in alignment with the rows being picked, or are for some other reason down such as from windstorms or the like, a wheel shield 14 is provided. The shield 14 is hung on the outside of the inwardly spaced gathering mechanism 13 and extends from a position forwardly adjacent the forward end of the gathering unit 13 to a position rearwardly thereof and skirting the forward portion of the outwardly spaced large tractor wheels 12.

The wheel shield includes a relatively large skirt portion 15 which tapers downwardly and forwardly to a point at 16. As best shown in Figure 2, the wheel shield 14 has its skirt 15 bent laterally to form a top wall portion 17. This bend is formed along the line 18 as shown in Figure 1 and creates the width necessary to extend between the lateral extension of the gathering sheet 13 and the widely spaced traction wheel 12. The inner edge of the top flange 17 is rolled upwardly as shown at 19 to prevent the sheet or shield from having sharp cutting edges. A pin 20 projecting downwardly from the flange 17 is formed integrally with this flange and thus is unitary and rigid with respect to the entire wheel shield 14. An angle member 21 is fastened by means of bolts or the like 22 to the outer side of the gathering sheet 13. One leg or wall 23 of the angle 21 abuts the substantially vertical wall 24 of the gathering sheet 13 and the other leg 25 of the angle 21 provides a ledge on which the top flange 17 of the wheel shield 14 may rest. The leg 25 of the angle 21 is provided with a relatively large aperture through which the pin 20 may be easily placed.

A bracket 26 is mounted on the gathering mechanism 13 upon the outer wall thereof spaced beneath the mounting of the angle member 21. The bracket 26 includes a top wall 27 having a flange 28 which abuts a flange 29 on the gathering member 13 and by means of a bolt 30 the flanges are fastened together. An angle member 31 is bolted as at 32 to the gathering member 13 and provides a substantially horizontal wall or side member 33 to which a bottom plate 34 of the bracket 26 may be attached by bolts or the like 35. The bottom wall 34 and the top wall 27 of the bracket 26 are joined by a substantially vertical wall 36. As shown in Figure 2 the wall 36 is adapted to have an angle member 37 fixedly mounted on the inner wall of the skirt 15 to abuttingly engage the vertical wall 36 and thereby form a fixed support for the bottom of the wheel shield 15. For purpose of rigidity an angle member 38 is affixed to the bottom of the skirt 15 and is substantially stiffer than the light gauged skirt portion 15 which narrows down to the point at 16. Both the top wall 27 and the bottom wall 34 are adjustable in length as shown by the overlapping bolted portions 27a and 34a to allow for adjusting the shield 14 to various spaced positions to accommodate various sizes of tractors and tractor wheels.

As best shown in Figure 3 the forward pointed portion 16 of the skirt shield 14 is provided with a generally downwardly projecting pin 39 which is adapted to pass through an opening 40 in the top flange 25 of the angle 21. The spacer or reinforcing member 41 is provided beneath the top flange 17 to enable the wheel shield to rigidly support the downwardly projecting pin 39. It should be noted that the hole or aperture 40 in the angle member is sufficiently large to provide a substantial looseness between the pin 39 and the walls of the hole 40.

It is apparent that herein is provided a wheel shield for tractor mounted corn pickers in which the corn picker gathering unit is provided with a rigid supporting member having fore and aft spaced apertures to receive spaced pin members on the wheel shield for removable attachment of the wheel shield thereon. A third point of connection between the corn picker and the wheel shield is provided adjacent the bottom thereof wherein the skirt 15 by its angle member 37 abuts the vertical wall 36 of the bracket 26. Thus the wheel shield is spaced outwardly from the gathering unit 13 to readily guide stalks around the large traction wheel 12 of the tractor to prevent a running down of the corn which will be subsequently harvested. The construction of the mounting permits outward swinging of the wheel shield 14 about the pins as hinge points after which the shield may be entirely removed merely by raising the entire shield vertically so that the pins or projections 20 and 39 may be removed from the apertures in the angle member 21. There is no positive connection between the bracket 26 and the skirt 15 of the wheel shield yet the shield 14 may not be vertically removed from the gathering unit 13 without first pulling or swinging the skirt 15 outwardly about the pins as hinge points to disengage the ledge of the angle member 37 from the bottom wall 34 of the bracket 26.

I am aware that various details of construction may be varied without departing from the principles disclosed herein and I therefore do not propose limiting the patent granted hereon otherwise than as necessitated by the appended claim.

What is claimed is:

A removable wheel shield for tractor mounted corn pickers of the type having a forwardly and downwardly inclined gathering unit spaced inwardly of a large traction wheel comprising said gathering unit having fore and aft spaced apertures and a bracket projecting outwardly from a position adjacent the bottom of the gathering unit, and said removable wheel shield having a generally vertically disposed skirt, a laterally bent top wall, pins projecting downwardly from said top wall at spaced fore and aft positions thereon, said skirt arranged and constructed to have said pins loosely and removably engage said spaced apertures in said gathering unit and to abut said bracket on the bottom of the gathering unit to maintain the skirt spaced from the gathering unit and to extend around the forward portion of the outwardly spaced traction wheel, said skirt having an angle member fastened thereto adjacent said bracket on said gathering unit and said angle member having an outwardly projecting wall to be disposed beneath said gathering unit bracket and to thereby prevent removal of said wheel shield except after first swinging said wheel shield outwardly about the pins as hinge points.

References Cited in the file of this patent

UNITED STATES PATENTS

| | | |
|---|---|---|
| 2,284,909 | Kuhlman | June 2, 1942 |
| 2,523,640 | Zipf | Sept. 26, 1950 |